(12) United States Patent
Nosker et al.

(10) Patent No.: US 8,497,324 B2
(45) Date of Patent: Jul. 30, 2013

(54) METHODS OF INCREASING TOUGHNESS OF IMMISCIBLE POLYMER BLENDS

(75) Inventors: Thomas J. Nosker, Stockton, NJ (US); Jennifer K. Lynch, Franklin Park, NJ (US); Richard Lehman, Princeton, NJ (US); James D. Idol, Columbus, OH (US); Richard W. Renfree, Scotch Plains, NJ (US); Maryann Renfree, legal representative, Scotch Plains, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 0 days.

(21) Appl. No.: 12/922,940

(22) PCT Filed: Mar. 18, 2009

(86) PCT No.: PCT/US2009/037552
§ 371 (c)(1),
(2), (4) Date: Jan. 12, 2011

(87) PCT Pub. No.: WO2009/117509
PCT Pub. Date: Sep. 24, 2009

(65) Prior Publication Data
US 2011/0143058 A1    Jun. 16, 2011

Related U.S. Application Data

(60) Provisional application No. 61/037,504, filed on Mar. 18, 2008.

(51) Int. Cl.
*C08L 67/02* (2006.01)
(52) U.S. Cl.
USPC .......................................... 525/165; 525/445
(58) Field of Classification Search
USPC ................................................. 525/165, 445
See application file for complete search history.

(56) References Cited

U.S. PATENT DOCUMENTS

| 6,572,956 | B1 * | 6/2003 | Pickett et al. ................ 428/212 |
| 6,770,365 | B2 * | 8/2004 | Yoshimura et al. ........... 428/373 |
| 6,962,431 | B1 * | 11/2005 | Luker ............................. 366/81 |
| 2003/0180542 | A1 | 9/2003 | Pickett et al. |
| 2005/0192403 | A1 * | 9/2005 | Nosker ........................... 525/63 |
| 2011/0071238 | A1 * | 3/2011 | Bastioli et al. ................ 524/17 |

FOREIGN PATENT DOCUMENTS

CN          1445280 A        10/2003

OTHER PUBLICATIONS

Virgilio, N.; Favis, B.D.; Macromolecules, 2005, p. 2368-2375.*
ComDel Innovation Data Sheet, 2011, p. 1-6; accessed online [retrieved on Sep. 16, 2011]; URL: <http://www.comdelinc.com/pdf/ComDelInnovationDataSheets.pdf>.*

\* cited by examiner

*Primary Examiner* — Robert Jones, Jr.
(74) *Attorney, Agent, or Firm* — Fox Rothschild LLP

(57) ABSTRACT

An immiscible polymer blend that includes an amount of poly(trimethylene terephthalate) (PTT) and an amount of poly(methylmethacrylate) (PMMA). A method for preparing an immiscible polymer blend by (a) identifying a first polymeric component and a second polymeric component as immiscible when blended; (b) combining the first polymeric component and the second polymeric component; and (c) mixing the first polymeric component and the second polymeric component to produce an immiscible polymer blend that includes structures in the blend having a maximum size of less than about 1,000 μm is also presented. An article that includes an immiscible polymer blend of poly(trimethylene terephthalate) (PTT) and poly(methylmethacrylate) (PMMA) and an article formed from an immiscible polymer blend prepared by the method of the present invention are also presented.

9 Claims, 5 Drawing Sheets

METHODS OF INCREASING TOUGHNESS OF IMMISCIBLE POLYMER BLENDS

CROSS-REFERENCE TO RELATED APPLICATIONS

This application is a National Stage filing under 35 U.S.C. §371(c) of International Application Serial No. PCT/US2009/037552 which claims priority to U.S. Provisional Application Ser. No. 61/037,504, which was filed on Mar. 18, 2008, both of the disclosure of which is are incorporated herein by reference.

BACKGROUND OF THE INVENTION

Tough, high strain to failure materials with good stiffness (modulus) are needed by all segments of industry and commerce, but the automotive and aerospace industries are particularly in need of such materials that are also inexpensive and/or lightweight. Traditional approaches have used exotic polymers (expensive) or ceramic fiber reinforced composites (heavy) to achieve these goals.

The key to achieving high levels of toughness in combination with high modulus is to generate immiscible blends of materials that individually provide the necessary properties. The difficulty in achieving this is that most immiscible blends of tough [e.g. HDPE] and stiff [e.g. PMMA] polymers have miserable properties.

SUMMARY OF THE INVENTION

The present invention is directed to an immiscible polymer blend that includes an amount of poly(trimethylene terephthalate) (PTT) and an amount of poly(methylmethacrylate) (PMMA). In one embodiment, the amount of each of PTT and PMMA ranges from about 5 wt % to about 95 wt % to total 100 wt %. In another embodiment, the amount of each of PTT and PMMA ranges from about 15 wt % to about 85 wt % to total 100 wt %. In an additional embodiment, the amount of each of PTT and PMMA ranges from about 20 wt % to about 80 wt % to total 100 wt %.

Also provided is a method for preparing an immiscible polymer blend by (a) identifying a first polymeric component and a second polymeric component as immiscible when blended; (b) combining the first polymeric component and the second polymeric component; and (c) mixing the first polymeric component and the second polymeric component to produce an immiscible polymer blend that includes structures in the blend having a maximum size of less than about 1,000 μm. In one embodiment, the combination of the first polymeric component and the second polymeric component is selected from a high-density polyolefin and polystyrene, a high-density polyolefin and acrylonitrile-butadiene-styrene, a high-density polyolefin and polycarbonate, a high-density polyolefin and acrylonitrile-butadiene-styrene/polycarbonate, a high-density polyolefin and poly(methyl methacrylate), poly(trimethylene terephthalate) and poly(methylmethacrylate), polycarbonate and poly(trimethylene terephthalate), and polystyrene and poly(trimethylene terephthalate). In another embodiment, the high-density polyolefin is high-density polyethylene. In yet another embodiment, the mixing step is performed with a device selected from single screw extruders with recirculating high elongational flow mixing elements, compound twin screw extruders, and static mixers mounted to a single screw extruder.

The present invention also includes an article that includes an immiscible polymer blend of poly(trimethylene terephthalate) (PTT) and poly(methylmethacrylate) (PMMA). Also provided is an article formed from an immiscible polymer blend prepared by the method of the present invention. In one embodiment, the article is selected from composite building materials, railroad ties, poles, marine pilings, simulated tree trunks, trash receptacles, boxes, cartons, doormats, floor coverings, lawn decorations and ornaments, automobile parts, toys, wagons and gardening carts, buildings and sheds, furniture, tables and chairs, park benches, and housings for electronic components. In another embodiment, the composite building material is selected from dimensional lumber, beams, tongue-and-groove decking panels, blocks, boards, and sheets.

DETAILED DESCRIPTION OF THE INVENTION

Figure 2:
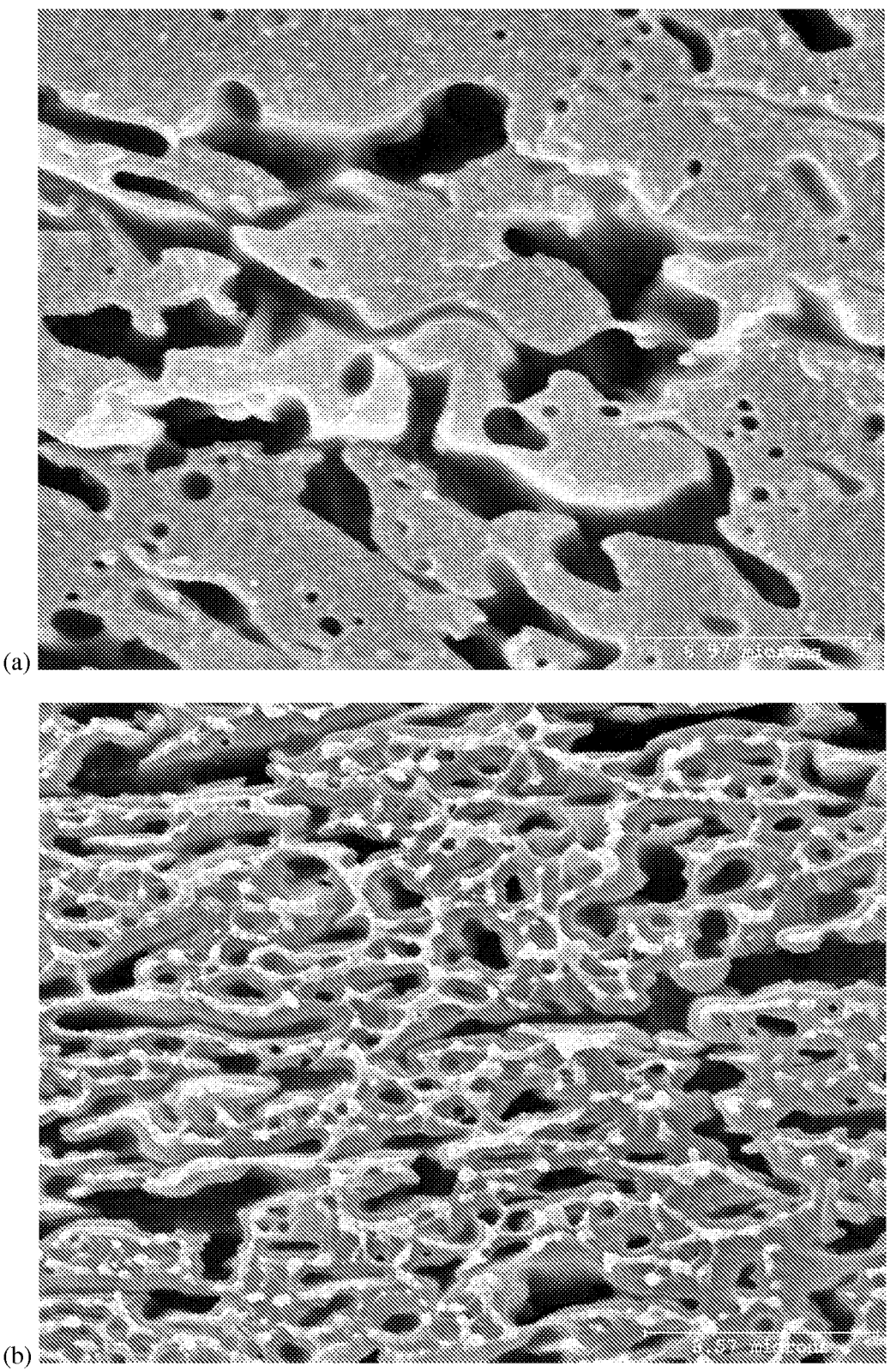
FIG. 2 is a comparison of the effect of processing on structure: (a) a PS/PE immiscible polymer blend prepared using a single screw extruder and (b) a PS/PE immiscible polymer blend prepared according to a method of the present invention.
Figure 3:
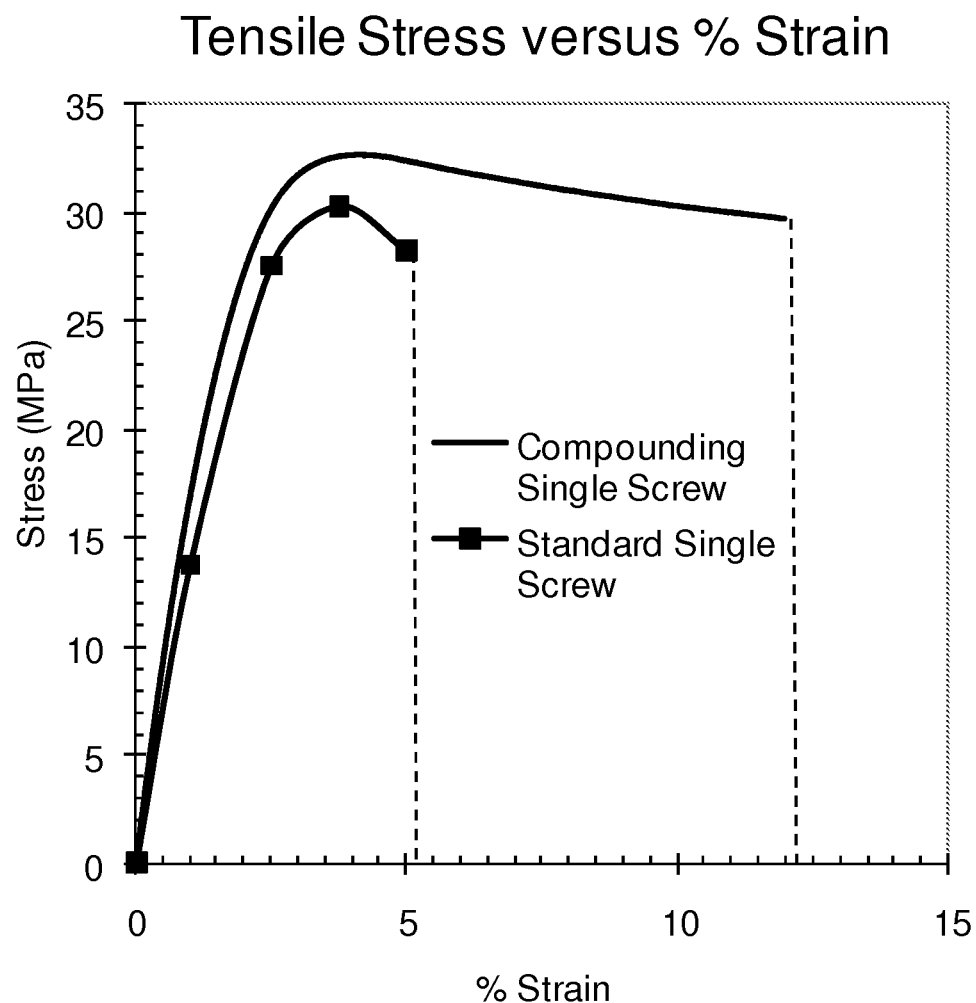
FIG. 3 is a stress/strain curve demonstrating that the fine-structured immiscible polymer blends prepared according to methods of the present invention possess increased toughness and strain to failure over coarse-structured blends.

The present invention relates to methods for preparing immiscible polymer blends by increasing mixing over and above the typical single screw extruder such that the microscale or nanoscale morphology of the resulting blend is much finer (10×, typically) than blends prepared using only the typical single screw extruder. (FIGS. 2 and 3). The phrase "immiscible polymer blend" is defined herein as a co-continuous, integrated multi-phase, three-dimensional microstructured network. Microscale or nanoscale morphology includes structures in the blend having a maximum size of less than about 1,000 μm, preferably less than about 500 μm, and even more preferably less than about 10 μm.

Finer structures give more crack deflection (more interfaces, shorter distance between phases, and strain absorption (phases are not bonded with each other). Through this specialized thermal processing of immiscible polymer blends, an extremely fine morphology is developed that permits efficient load transfer such that modulus is retained but microstrain is permitted between the phases, thus inducing high strain prior to failure.

The resulting blends of the present invention possess similar stiffness and strength to the typical immiscible polymer blend which has passed through a single screw extruder, but with much greater toughness and ductility. "Toughness" is defined as the ability to absorb energy while being deformed without fracturing. Mechanical properties of the polymer blends can be measured by applying a load to a specimen and measuring the resulting deflection. From the load versus deflection data, stress versus strain data is calculable. Stress is equivalent to the applied load divided by the cross-sectional area of the specimen. Strain is equivalent to the measured deflection divided by the original specimen length. Mechanical properties are obtained from the stress versus strain plot. The initial slope of a stress versus strain curve is called the Young's Modulus and is an indication of the material's stiffness. The ultimate strength is the maximum stress. The fracture strength and fracture strain are the values of stress and strain at which specimen fracture occurs. Ductility is quantified by the percent elongation at material failure, which is 100 times the strain measured at failure. A ductile material is able to undergo plastic deformation and has the ability to relieve locally high stresses at points of stress concentrations. Toughness is measured by the area under a stress-strain curve up to the point of material failure. A material of high toughness is one that has both high strength and substantial ductility.

Examples of equipment to increase mixing include single screw extruders with recirculating high elongational flow mixing elements, for example, those disclosed in U.S. Pat. No. 6,962,431 to Luker, the contents of which are herein incorporated by reference, compound twin screw extruders, and static mixers mounted to a typical single screw extruder.

The identification step includes determining the miscibility of the polymers based upon literature values and data or laboratory experiments or both. One of skill in the art is readily able to determine the miscibility of two or more polymers. Each of the first and second polymeric components can include one or more polymers (e.g. 1, 2, 3, 4, etc.). Exemplary polymeric starting materials and amounts for use in the methods of the present invention include those disclosed in U.S. Pat. Nos. 5,298,214 and 6,191,228 for blends of a high-density polyolefin and polystyrene, U.S. Pat. Nos. 5,789,477 and 5,916,932 for blends of a high-density polyolefin and thermoplastic-coated fiber materials, U.S. Publication No. 2005/0192403 for blends of a high-density polyolefin (e.g. high density polyethylene) and acrylonitrile-butadiene-styrene and/or polycarbonate, and International Publication No. 2006/125111 for blends of a high-density polyolefin and poly(methyl methacrylate). The disclosures of all six patents and applications are incorporated herein by reference. Additional polymeric starting materials include poly(trimethylene terephthalate) and poly(methylmethacrylate), polycarbonate and poly(trimethylene terephthalate), and polystyrene and poly(trimethylene terephthalate).

Additional polymeric starting materials useful in the present invention include those disclosed in U.S. Pat. Nos. 4,663,388; 5,030,662; 5,212,223; 5,615,158; and 6,828,372. The contents of all five patents are incorporated herein by reference.

The present invention also includes blends of poly(trimethylene terephthalate) (PTT) and poly(methylmethacrylate) (PMMA). The blend of the two polymers may be processed on conventional polymer processing equipment, such as extruders and injection molding machines, as well as in the method of the present invention. Blending as little as 5 wt % PMMA with PTT increases the viscosity of the PTT without damaging the properties and increases the processablity of PTT. This increased processability allows the PTT to be used as an engineering resin that is easily injection molded or extruded. Adding small amounts of PTT to PMMA decreases the viscosity of PMMA and increases the processability of PMMA for certain applications. In the co-continuous composition region, the PTT/PMMA blends are immiscible blends in which there is a mechanical interlocking at the interface of the two polymers.

The amount of each of PTT and PMMA in the blends ranges from about 5 wt % to about 95 wt %. In one embodiment, the amount of each of PTT and PMMA ranges from about 15 wt % to about 85 wt %. In another embodiment, the amount of each of PTT and PMMA ranges from about 20 wt % to about 80 wt %.

Preferably, the polymeric starting materials undergo distributive mixing during extrusion. The polymeric components in any suitable form, for example, flake, pellet, or powder form are dry-blended in the appropriate or desired composition ratio. The blend is gravity fed from the single screw extruder's hopper into the extruder barrel. Material enters through the feed throat, an opening near the rear of the barrel, and comes into contact with the screw. The rotating screw forces the resin forward along the barrel, heated to the desired melt temperature of the molten plastic. Frictional heat is generated by intense pressure and friction between resin particles and the barrel walls. Molten plastic is pumped down the screw, forced through a screen pack to remove contaminants, forced through the die that provides the resin with the final product profile, and cooled in an external water bath or by pulling through a set of cooling rolls. In twin screw extrusion, two screws are housed inside the barrel and either co-rotate or counter-rotate. The residence time is a function of the desired screw's revolutions per minute (RPM) and may be dependent upon the materials.

The blends of the present invention are suitable for composite building materials, such as, dimensional lumber (e.g. I-Beams, C-Beams, and T-Beams), tongue-and-groove decking panels, blocks, boards, sheets, and the like. Lumber made from these blends can be used as joists, posts, and beams, for example. Such articles may be used almost anyplace where dimensional lumber or sheets are currently used. They can be used, for example, in house construction in place of boards, interior and exterior plywood, flooring, roofing, decks, and rafters. The definition of the term "lumber" as used herein includes articles formed into the shape of lumber.

Additional exemplary articles that can be prepared from the immiscible polymer blends of the present invention include those disclosed in U.S. Pat. Nos. 5,298,214; 6,191,228; 5,789,477; and 5,916,932, U.S. Publication No. 2005/0192403, and International Publication No. 2006/125111, for example, railroad ties; poles; marine pilings; simulated tree trunks for use as telephone poles or guard rail posts or for use in construction of, for example, a pier or boardwalk, and the like; trash receptacles; boxes; cartons; doormats; floor coverings; lawn decorations and ornaments; automobile parts; toys; wagons and gardening carts; buildings and sheds; furniture e.g., casual furniture such as used for indoor/outdoor use including tables and chairs, park benches, etc.; housings for electronic components including consumer electronics such as radios, televisions, stereo systems, VCRs, DVDs, video game players and cartridges, computer housings, keyboards and monitors; and the like. The articles can be structural, decorative, or both. They may be textured to simulate wood grain, to simulate clapboard or cedar shake, or may have raised or imprinted designs of any manner. They may also include indicia.

The following non-limiting examples set forth herein below illustrate certain aspects of the invention.

EXAMPLES

Example 1

PS/HDPE Blends

Figure 1:
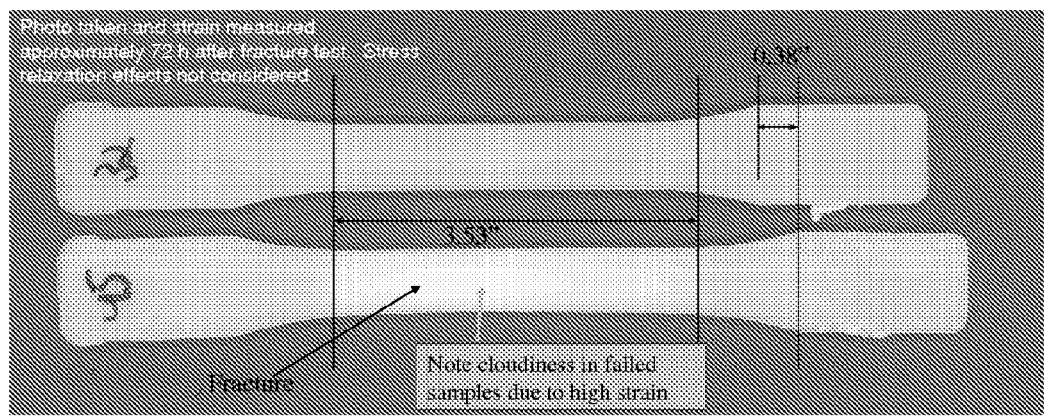
FIG. 1 demonstrates the high strain to failure (12%) in ultra-fine structured PS/PE composites.

Shown below are samples of 35 wt % PS and 65 wt % HDPE processed the typical way with a standard single screw extruder and with the compounding single screw of U.S. Pat. No. 6,962,431 for comparison. (FIG. 1). The morphology of each sample is shown in FIG. 2, as determined using a scanning electron microscope. The PS phase was leached using toluene in order to better show the morphology. For comparison, the micrograph in FIG. 2(a) is that of the sample produced using a standard single screw extruder. FIG. 2(b) is that of the sample produced using the compounding single screw of the '431 patent. At the same scale of 8.57 μm, the standard single screw extruder produced a much more coarse structure than the compounding single screw of the '431 patent, which in turn affects the mechanical properties. The immiscible polymer blend compounded using the '431 extruder possesses about the same stiffness and strength as the sample prepared with the standard extruder, but with much more area under the stress strain curve and a correspondingly higher toughness. (FIG. 3). The area under the stress versus strain curves is indicated in FIG. 3 by the vertical dashed lines. The mechanical properties are presented in Table 1:

TABLE 1

Mechanical property comparison of a 35/65 wt % PS/HDPE blend prepared using a standard single screw extruder and a compounding single screw extruder.

| Extruder Type | Modulus (GPa) | Ultimate Strength (MPa) | % Strain at Fracture | Strength at Fracture (MPa) |
| --- | --- | --- | --- | --- |
| Standard | 1.43 | 30.0 | 5.0 | 28.1 |
| Compounding | 1.91 | 32.7 | 12.0 | 29.7 |

Example 2

PTT/PMMA Blends

Figure 4A:
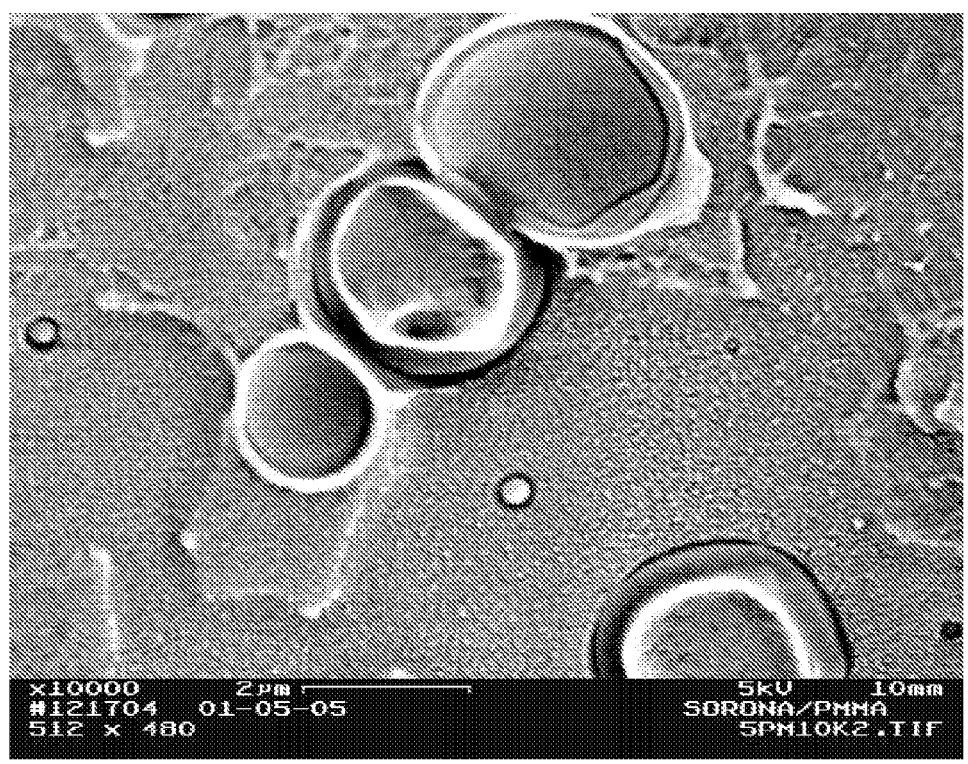
FIGS. 4a and b are SEM micrographs of the fracture surfaces of a 95/5 wt % PTT/PMMA blend (a) injection molded and (b) processed using the compounding single screw of U.S. Pat. No. 6,962,431.
Figure 4B:
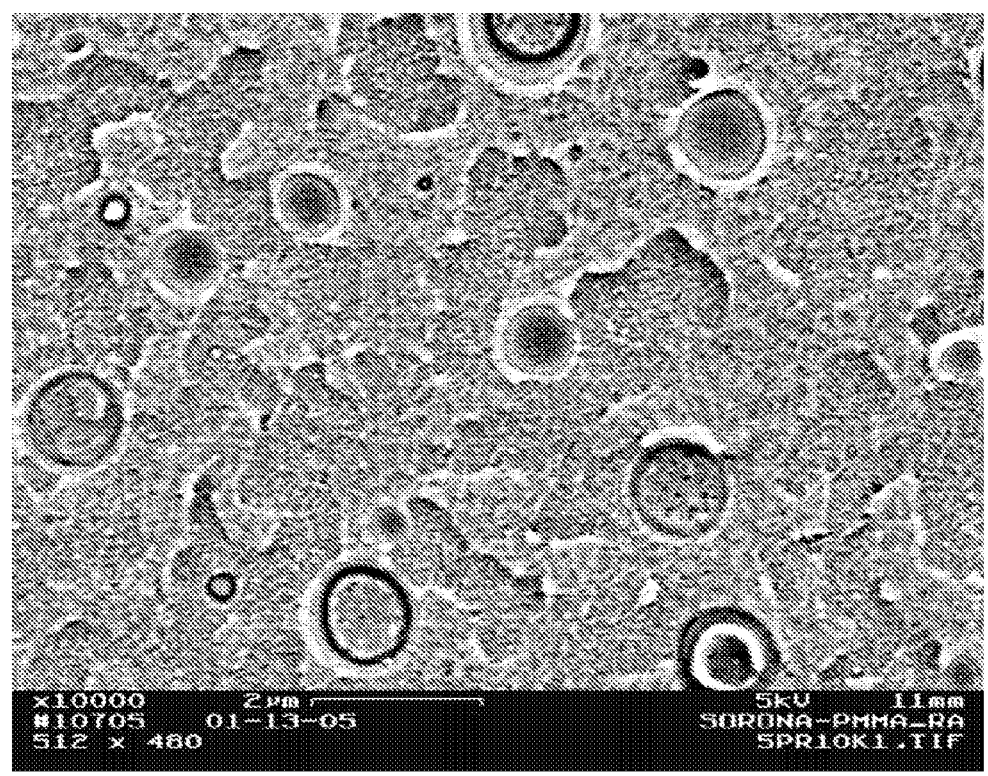
Figure 5:
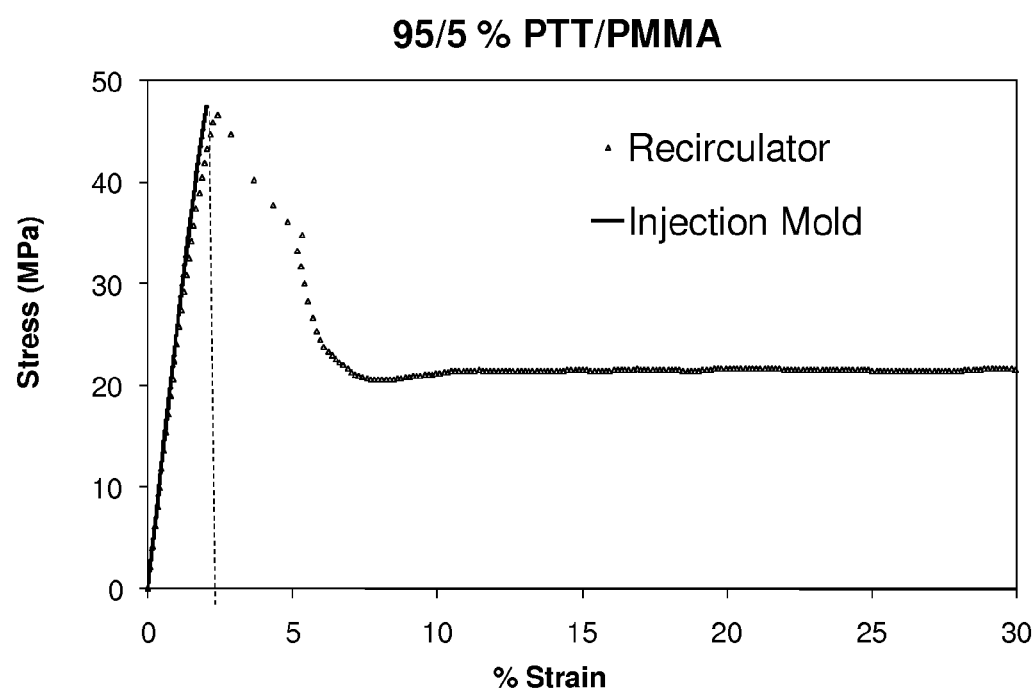
FIG. 5 is a graph of stress versus percent strain for a 95/5 wt % PTT/PMMA blend that was injection molded and another blend processed using the compounding single screw of U.S. Pat. No. 6,962,431 ("Recirculator").

Blends of poly(trimethylene terephthalate) (PTT) and poly(methylmethacrylate) (PMMA) prepared using typical injection molding (IM) methods were compared with blends prepared with the compounding single screw of U.S. Pat. No. 6,962,431. SEM micrographs of 95/5 wt % PTT/PMMA indicate that the compounding single screw of the '431 patent produces a much better level of mixedness of PMMA particles in the PTT matrix (FIGS. 4a and b). FIG. 5 presents tensile mechanical property stress versus strain data. Each curve is the average of 5 specimens tested. The injection molded blend fractured at about 2.5% strain while the blend that was processed with the compounding single screw of the '431 patent did not fracture prior to termination of the tests at 30% strain.

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and script of the invention, and all such variations are intended to be included within the scope of the following claims.

What is claimed is:

1. An immiscible polymer blend consisting of an amount of poly(trimethylene terephthalate) (PTT) ranging from 80 wt % to 95 wt % and an amount of poly(methylmethacrylate) (PMMA) ranging from 5 wt % to 20 wt % to total 100 wt %, wherein structures in the blend have a maximum size from about 0.9 μm to about 1,000 μm.

2. The blend of claim 1, wherein the amount of PTT ranges from 85 wt % to 95 wt % and the amount of PMMA ranges from 5 wt % to 15 wt % to total 100 wt %.

3. An article comprising the polymer blend of claim 1.

4. The article of claim 3, wherein said article is selected from the group consisting of composite building materials, railroad ties, poles, marine pilings, simulated tree trunks, trash receptacles, boxes, cartons, doormats, floor coverings, lawn decorations and ornaments, automobile parts, toys, wagons and gardening carts, buildings and sheds, furniture, tables and chairs, park benches, and housings for electronic components.

5. The article of claim 3, wherein said composite building material is selected from the group consisting of dimensional lumber, beams, tongue-and-groove decking panels, blocks, boards, and sheets.

6. A method for preparing an immiscible polymer blend comprising:
 a) combining an amount of poly(trimethylene terephthalate) (PTT) ranging from 80 wt % to 95 wt % and an amount of poly(methylmethacrylate) (PMMA) ranging from 5 wt % to 20 wt % to total 100 wt %; and
 mixing the PTT and PMMA with a single screw extruder with recirculating high elongational flow mixing elements to produce an immiscible polymer blend comprising structures in the blend having a maximum size from about 0.9 μm to about 1,000 μm.

7. An article formed from an immiscible polymer blend prepared by the method of claim 6.

8. The article of claim 7, wherein said article is selected from the group consisting of composite building materials, railroad ties, poles, marine pilings, simulated tree trunks, trash receptacles, boxes, cartons, doormats, floor coverings, lawn decorations and ornaments, automobile parts, toys, wagons and gardening carts, buildings and sheds, furniture, tables and chairs, park benches, and housings for electronic components.

9. The article of claim 8, wherein said composite building material is selected from the group consisting of dimensional lumber, beams, tongue-and-groove decking panels, blocks, boards, and sheets.

* * * * *